United States Patent [19]

Laing

[11] Patent Number: 5,292,140
[45] Date of Patent: Mar. 8, 1994

[54] CARRIER FOR CYLINDRICAL CONTAINERS OF LIQUIDS AND GASES

[76] Inventor: Michael P. Laing, 4680 NW. 19th Dr., Coral Springs, Fla. 33071

[21] Appl. No.: 749,982

[22] Filed: Aug. 26, 1991

[51] Int. Cl.$^5$ .............................................. B62B 1/26
[52] U.S. Cl. .................................. 280/47.33; 220/737; 248/311.2; 280/79.5; D34/23
[58] Field of Search ....................... 248/129, 310, 311.2; 220/400, 737; 280/47.131, 47.32, 47.331, 79.5, 47.33; D34/23

[56] References Cited

U.S. PATENT DOCUMENTS

| | | | |
|---|---|---|---|
| 3,272,529 | 9/1966 | Rachman | 280/47.131 |
| 3,301,570 | 1/1967 | Berman | 280/47.131 |
| 3,310,318 | 3/1967 | Nagel | 280/47.131 |
| 4,544,173 | 10/1985 | Kellermyer | 280/79.5 X |
| 4,756,497 | 7/1988 | Lan | 220/737 X |
| 4,941,635 | 7/1990 | Lan | 248/311.2 X |

OTHER PUBLICATIONS

"Trident Diving Equipment" 1989, p. 57.

*Primary Examiner*—Margaret A. Focarino
*Assistant Examiner*—Michael Mar

[57] ABSTRACT

A carrier for cylindrical containers to be mounted at the lower end of cylindrical containers, held in place by friction and suction pressure between the cavity walls accommodating the container and the container wall. A channel system inside the cavity, interconnected in itself and with a center hole which is closed from the bottom side of the carrier body with an air-tight removable plug allows easy removal and exchange of containers. The carrier body has a form of a horseshoe at its base and terminates conically upward to its cylindrical top. A roller wheel with a recessed diameter center section in conjunction with a foot stand located opposite to the roller wheel forms a three point stand for secure upright standing of the container. The horseshoe form of the unibody carrier prevents the container from rolling. The roller wheel with the recessed diameter center section facilitates rolling movement on soft surfaces or grounds. The exterior of the carrier is smooth without protuberances or sharp edges and will not cause injury or discomfort to the user.

7 Claims, 1 Drawing Sheet

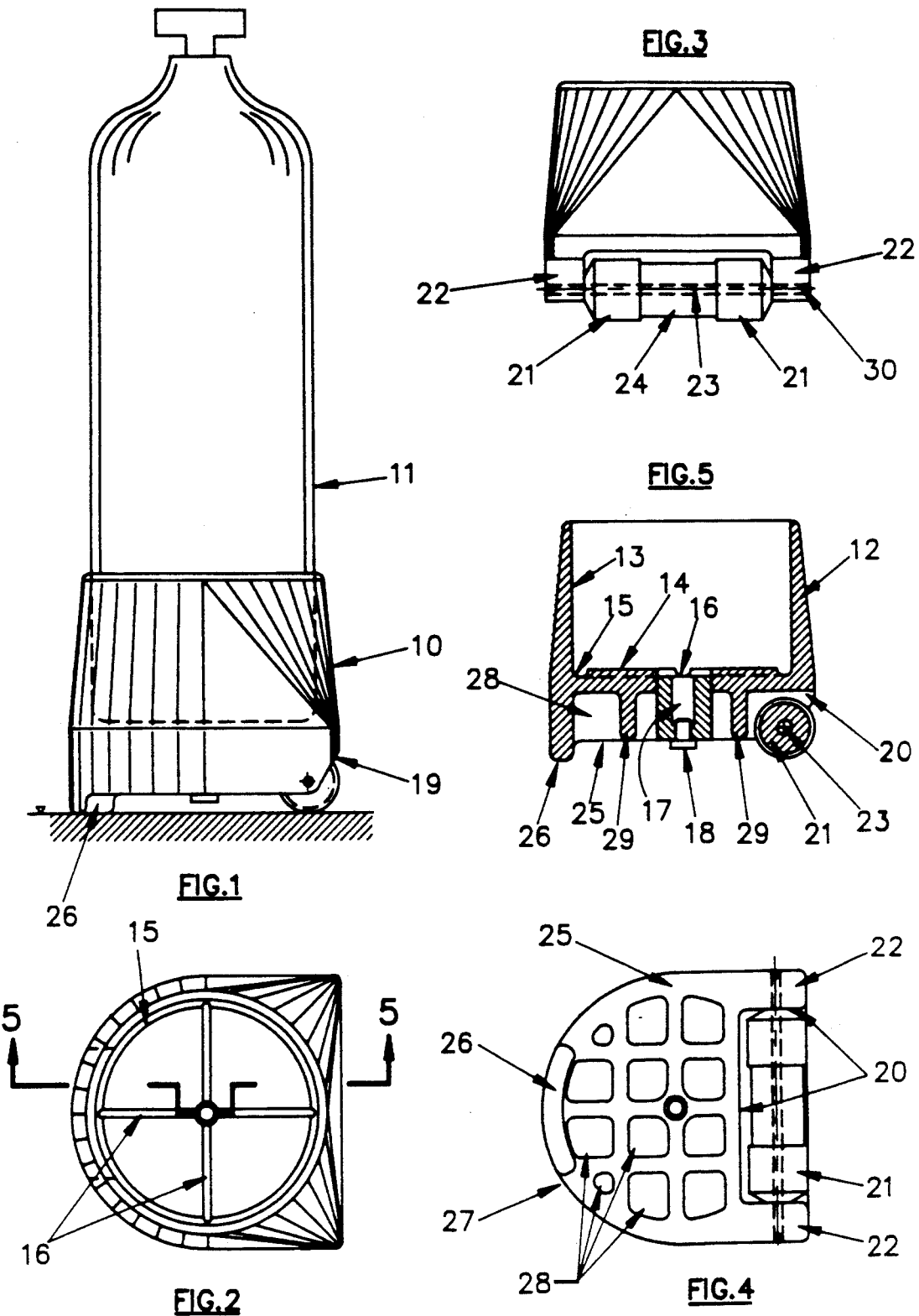

CARRIER FOR CYLINDRICAL CONTAINERS OF LIQUIDS AND GASES

BACKGROUND OF THE INVENTION

Cylindrical containers for liquids and gases, substantially longer than its overall diameter, are sometimes heavy and hard to handle and require special carriers for transport during use and/or exchange or replacement.

It is the intent of this disclosure to describe a device, which allows the user to easily relocate and control even.,heavy containers without the need for separate means of transport, and at the same time serve as protection for the container as well as for its surroundings against abrasive and shock damage, and provide stable and secure position of the container while standing upright with a defined three point stand on the device and prevent rolling of the cylindrical container while laying on a flat surface by virtue of the external shape of the device.

SHORT DESCRIPTION OF THE INVENTION

This device, in the following called "Carrier", is made of resilient thermoplastic and/or vulcanized rubber as the intended environment may require. The outside of the carrier body is formed in a horseshoe form with a straight side at its base extending conically up all around to the cylindrical opening of the container holding cavity, terminating in a rim with substantial thickness, measuring substantially less in height than the length of the cylindrical container it is intended to carry. From the upper side of the carrier body located at the center of the horseshoe is the cylindrical cavity accommodating the cylindrical tank in a snug fit. The bottom shape of the cavity is formed accordingly to the bottom shape of the cylindrical container it is intended to hold. A radial channel at the bottom of the cavity is interconnected with four axial channels to the cylindrical opening at the bottom center of the cavity, which opening is closed by a removable plug located at the lower side of the carrier body.

Thus the cylindrical container is held in its position inside the carrier by the lateral friction between the carrier cavity and container wall and suction pressure formed between the cavity and the container if the container is pulled while the plug is closing the opening in the center of the cavity. Removing the said plug allows for easy exchange of the container and/or for removal of foreign matters and liquids which might have accumulated in the channels and in between the cavity and the container.

The lower side of the carrier body at the straight side of the horseshoe form provides a recessed area to accommodate a single roller wheel. The roller wheel is built as a single body roll with a larger wheel diameter at both ends of the roller wheel cylinder and a recessed cylinder diameter with substantial length of the roller wheel in between. The circular ends of the roller wheel are conical shaped from the outside diameter of the roller wheel to the axle bore at the center of the roller wheel. Thus preventing accumulation of foreign matter between the roller wheel and the two lateral axle anchors extending down from the carrier body. The axle reaches through the extended axle anchors incorporated in the carrier body and the roller wheel turns free on the axle.

At the bottom side of the carrier body located at the center of the curved side of the horseshoe form and opposite to the roller wheel and incorporated to the carrier body, a foot stand extends down to the same level as the outside diameter of the roller wheel. Thus providing a defined three point stand for the cylindrical container in upright position between the two larger wheel diameters on both extremities of the roller wheel and the foot stand.

The above described external form of the carrier body prevents the cylindrical container from rolling while lying on a flat surface.

Other advantages of this invention will become more apparent upon reading of the following detailed description and examination of the drawing, wherein same reference numbers refer to same parts throughout, and in which:

FIG. 1 is a side elevation view of the carrier mounted on a typical cylindrical container standing upright on a flat surface.

FIG. 2 is a top plan view of the carrier

FIG. 3 is a front plan view of the carrier

FIG. 4 is a bottom plan view of the carrier

FIG. 5 is a cross sectioned view taken on line 5—5 of FIG. 2

Referring to the drawings, the carrier 10 has a general outer form of a closed horseshoe on its base and a generally cylindrical outer and inner shape on its upper side, that fits snug on the lower end of a cylindrical container 11. The cylindrical container 11 has a substantially uniform diameter over its length and the bottom of the cylindrical container 11 might be flat with a radius 18 as shown, or might have any other regular or irregular shape.

The carrier 10 has a side wall 12 extending down conically from the cylindrical upper part to the outer limits of its base and a cylindrical cavity 13 which terminates to a bottom 14 with a basically equal shape as the bottom shape of the cylindrical container the carrier is intended for. At the bottom 14 of the cylindrical cavity is a ring channel 15 located at the outer diameter of the cavity 13.

The ring channel 15 is interconnected with axial channels 16, basically of the same size and shape of the ring channel, to the center Bore 17 of the carrier, which is closed from the bottom side of the carrier 10 by a pressure fit or screwed, removable plug 18.

The front side of the carrier 10 has a chamfer 29 and a basically rectangular recess 20 to accommodate a unibody roller wheel 21, so as to provide two equally wide anchors 22 for the roller wheel axle 23 in the carrier body 10.

The roller wheel 21 is a unitary molded structure of plastic material with a basically cylindrical shape, substantially longer than its diameter, with a center bore to accommodate the axle 23, The roller wheel 21 has a conical shape 24 at both ends. Said cone 24 reaches from the outer diameter of the roller wheel 21 to the center Bore for the axle 23. Thus avoiding accumulation of foreign matter between the anchors 22 and the roller wheel 21.

The outer cylinder of the roller wheel 21 has a cylindrical recess 24, which is substantially less in diameter than the outer diameter of the roller wheel 21, starting at equal distance from both ends of the roller wheel 21. Thus the roller wheel 21 provides two defined rolling points for the carrier and at the same time, the recess 24 on the roller wheel 21 provides additional rolling surface on soft ground, facilitating the movement of the carrier 10 with the attached container 11 on such surfaces or grounds. The roller wheel 21 turns freely over the axle 23.

At the bottom 25 of the carrier body 10 and on the opposite side of the roller wheel 21 is a foot stand 26, with a substantial length along the curved side 27 of the horseshoe formed carrier body 10, extending straight down from the bottom 25 to the level of the outside diameter of the roller wheel 21. Thus providing the third defined point for a three point stand of the carrier, permitting to have a secure stand for the cylindrical container while standing upright.

From the bottom 25 of the carrier, reaching upward, are several cavities 28 spaced from each other in a way to leave reinforcing structural ribs 29 of substantial thickness. The depth of the cavities 28 is such that a wall of sufficient structural strength and stiffness remains between the top of those cavities 28 and the bottom 14 of the container cavity 13. Thus economizing required raw material and at the same time providing sufficient structural strength to the carrier.

The axle 23 is made of metal, rustproof or chemical resistant if the intended environment requires, and is fixed to the carrier 10 on the anchor 22 by means of a spring bolt 30, reaching through the center of the axle into the anchor 22 such as to prevent lateral movement of the axle 23 in relation to the carrier 10.

The carrier body 10 is a unitary molded structure of resilient plastic material such as polyurethane, polyvinyl chloride, or vulcanized rubber, such as to accommodate slight variations in container diameters. The carrier has a smooth surface with rounded corners such as to avoid injury or discomfort to the user.

The outer shape 27 of the carrier 10 in form of a horseshoe provides also three stable positions for the carried cylindrical container while lying on a flat surface.

Having described my invention, I now claim:

1. A carrier device for moving cylindrical containers along a floor, ground or the like, said carrier device operatively associated with a bottom portion of the cylindrical containers, said device comprising:
   an integrally molded resilient body having a base member and an upper member including a side wall extending downward conically to said base portion, said base member having a top portion and bottom portion, said upper member having a cylindrical cavity shaped to conform to the bottom portion of the cylindrical container for snugly receiving the bottom portion of the cylindrical container, said cavity having a cavity wall;
   means along a lower portion of one end of said base member for accommodating a roller wheel at a first end of said base member, wherein said means for accommodating is a substantially rectangular recess operatively associated with said base member, said roller wheel turning freely over an axle attached to said base member, said roller wheel having a substantially cylindrical shape, said roller wheel having a substantially reduced external diameter middle section to define two contact points on said roller wheel, said contact points being located on both sides of said middle section and in continuous contact with the ground; and
   means depending from a second end of said base member for providing a third contact point with the ground to prevent said carrier from rolling when said carrier is stationery.

2. The carrier device of claim 1, wherein said base member is shaped substantially to resemble a closed horseshoe.

3. The carrier device of claim 1, wherein said cavity includes means for suctionally retaining the cylindrical container within said cavity.

4. The carrier device of claim 3, wherein said means for suctionally retaining comprises a circular ring-channel disposed on a bottom portion of said cavity and positioned at the outmost diameter of the said cavity, said ring-channel being interconnected with a plurality of axial channels having substantially the same size as said ring-channel, said axial channels leading to a center bore extending through said base member to the bottom portion of said cavity and means for closing said bore from the bottom portion of said base member.

5. The carrier device of claim 4, wherein said means for closing said bore is a removable, air-tight plug.

6. The carrier device of claim 1, wherein said roller wheel having conical terminations reaching from an outer diameter of said roller wheel to a center bore of said roller wheel on both ends of said roller wheel.

7. The carrier device of claim 1, wherein said means for providing a third contact point with the ground is a support member disposed at an opposite second end of said base member and extending downwardly from the bottom portion of said base member.

* * * * *